(12) United States Patent
Jeong

(10) Patent No.: US 11,279,222 B2
(45) Date of Patent: Mar. 22, 2022

(54) COOLING FAN ASSEMBLY FOR VEHICLE

(71) Applicants: Hyundai Motor Company, Seoul (KR); Kia Motors Corporation, Seoul (KR)

(72) Inventor: Seong Bin Jeong, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/939,411

(22) Filed: Jul. 27, 2020

(65) Prior Publication Data
US 2021/0138893 A1   May 13, 2021

(30) Foreign Application Priority Data

Nov. 11, 2019 (KR) .......................... 10-2019-0143690

(51) Int. Cl.
*B60K 11/08*  (2006.01)
*F01P 5/06*  (2006.01)
*B60K 11/06*  (2006.01)

(52) U.S. Cl.
CPC ............ *B60K 11/085* (2013.01); *B60K 11/06* (2013.01); *F01P 5/06* (2013.01); *F01P 2025/66* (2013.01)

(58) Field of Classification Search
CPC .......... B60K 11/085; B60K 11/06; F01P 5/06; F01P 2025/66
See application file for complete search history.

(56) References Cited

FOREIGN PATENT DOCUMENTS

WO   WO-2019073694 A1 *  4/2019  ............... B60H 1/32

OTHER PUBLICATIONS

Google translation of WO2019073694A1.*

* cited by examiner

*Primary Examiner* — Jacob M Amick
(74) *Attorney, Agent, or Firm* — Slater Matsil, LLP

(57) ABSTRACT

A cooling fan assembly for a vehicle is provided. The cooling fan assembly includes a cooling fan having a hub and a plurality of blades extending from the hub, a fan shroud surrounding the cooling fan, and a screen movable transversely across a front of the cooling fan and a front of the fan shroud.

20 Claims, 15 Drawing Sheets

COOLING FAN ASSEMBLY FOR VEHICLE

CROSS-REFERENCE TO RELATED APPLICATIONS

This application claims priority to Korean Patent Application No. 10-2019-0143690, filed in the Korean Intellectual Property Office on Nov. 11, 2019, which application is hereby incorporated herein by reference.

TECHNICAL FIELD

The present disclosure relates to a cooling fan assembly for a vehicle.

BACKGROUND

A grille is mounted at a front end of a vehicle. The grille has a plurality of openings that permit ambient air to flow into a front compartment. The front compartment is located behind the grille, and receives a prime mover such as an engine or a power unit (e.g., an electric motor, a reduction gear). For example, the front compartment in an internal combustion engine vehicle may receive an internal combustion engine and its relevant components, and the front compartment in an electric vehicle may receive electric/electronic components such as a power unit (an electric motor, a reduction gear), an inverter, a circuit box, and a PTC heater.

The front compartment may receive a plurality of heat exchangers such as a condenser, a radiator, and an intercooler. A cooling fan assembly having a fan shroud and a cooling fan may be disposed behind the heat exchangers. As the cooling fan of the cooling fan assembly operates, the air passing through the grille may flow into the heat exchangers.

Referring to FIG. 1, a cooling fan assembly 1 may include a fan shroud 2 and a cooling fan 3, and the cooling fan 3 may have a hub 4 and a plurality of blades 5 extending from the hub 4. For example, when the air flows into the front compartment by the operation of the cooling fan 3, most of the air may intensively pass through a second area R2 in which the blades 5 rotate, and the remaining air may be blocked in a third area R3 corresponding to the front of the fan shroud 2 surrounding the blades 5 and a first area R1 in which the hub 4 is located, so that the air may be stagnant and the air velocity may slow down. When the air flows into the front compartment, the air flow may not be uniformly distributed due to structural limitations of the cooling fan assembly 1. Since the air does not uniformly come into contact with the heat exchangers as a whole, the cooling performance of the heat exchangers may be reduced.

In addition, a bumper, a back beam, and the like provided at the front end of the internal combustion engine vehicle are located in the middle of the grille. When the air flows into the front compartment through the grille, the air flow may not be uniformly distributed due to the bumper, the back beam, and the like. Since the air does not uniformly come into contact with the heat exchangers as a whole, the cooling performance of the heat exchangers may be reduced.

According to the related art, when the air flows into the front compartment by the cooling fan, the air flow may not be uniformly distributed with respect to the cooling fan assembly. Since the air does not uniformly come into contact with the heat exchangers as a whole, the cooling performance of the heat exchangers may be reduced.

The above information described in this background section is provided to assist in understanding the background of the inventive concept, and may include any technical concept which is not considered as the prior art that is already known to those skilled in the art.

SUMMARY

The present disclosure relates to a cooling fan assembly for a vehicle. Particular embodiments relate to a cooling fan assembly for a vehicle capable of uniformly distributing the flow of air into a front compartment of a vehicle depending on vehicle speeds.

The present disclosure has been made to solve problems occurring in the prior art while advantages achieved by the prior art are maintained intact.

An embodiment of the present disclosure provides a cooling fan assembly for a vehicle capable of uniformly distributing the flow of air into a front compartment of a vehicle depending on vehicle speeds, thereby improving cooling performance of heat exchangers received in the front compartment.

According to an embodiment of the present disclosure, a cooling fan assembly for a vehicle may include a cooling fan having a hub and a plurality of blades extending from the hub, a fan shroud surrounding the cooling fan, and a screen movable transversely across the front of the cooling fan and the front of the fan shroud.

The cooling fan assembly may further include a first roller and a second roller rotatably mounted on both sides of the fan shroud, and the screen may be wound on or unwound from the first roller and the second roller by a rotation of the first roller and a rotation of the second roller so that the screen may move transversely across the front of the fan shroud and the front of the cooling fan.

The screen may include a plurality of mesh elements and a closure element. The plurality of mesh elements may have a plurality of mesh openings that allow air to flow into the fan shroud and the cooling fan, and the closure element may be made of a material that is able to block the air from flowing into the fan shroud and the cooling fan.

Any one of the plurality of mesh elements and the closure element may be shifted to a position in which it covers the front of the fan shroud and the front of the cooling fan depending on vehicle speed conditions.

The plurality of mesh elements may include a first mesh element, a second mesh element connected to the first mesh element, and a third mesh element connected to the second mesh element.

The first mesh element may have a plurality of mesh openings having the same size.

The second mesh element may be divided into a center area corresponding to the hub of the cooling fan, an annular area corresponding to an area in which the blades of the cooling fan rotate, and an outermost area corresponding to the front of the fan shroud surrounding the blades. Mesh openings in the annular area may be smaller than mesh openings in the center area and mesh openings in the outermost area.

The third mesh element may be divided into a middle area corresponding to a bumper disposed at a front end of the vehicle, an upper area corresponding to an upper grille disposed at the front end of the vehicle, and a lower area corresponding to a lower grille disposed at the front end of the vehicle. Mesh openings in the middle area may be larger than mesh openings in the upper area and mesh openings in the lower area.

The closure element may be connected to the third mesh element.

The screen may further include an auxiliary mesh element individually overlapping the first mesh element, the second mesh element, and the third mesh element. The auxiliary mesh element may be divided into a lower area, a middle area located above the lower area, and an upper area located above the middle area. Mesh openings in the middle area may be larger than mesh openings in the lower area, and mesh openings in the upper area may be larger than mesh openings in the middle area.

BRIEF DESCRIPTION OF THE DRAWINGS

The above and other objects, features and advantages of the present disclosure will be more apparent from the following detailed description taken in conjunction with the accompanying drawings, in which.

DETAILED DESCRIPTION OF ILLUSTRATIVE EMBODIMENTS

Figure 1:
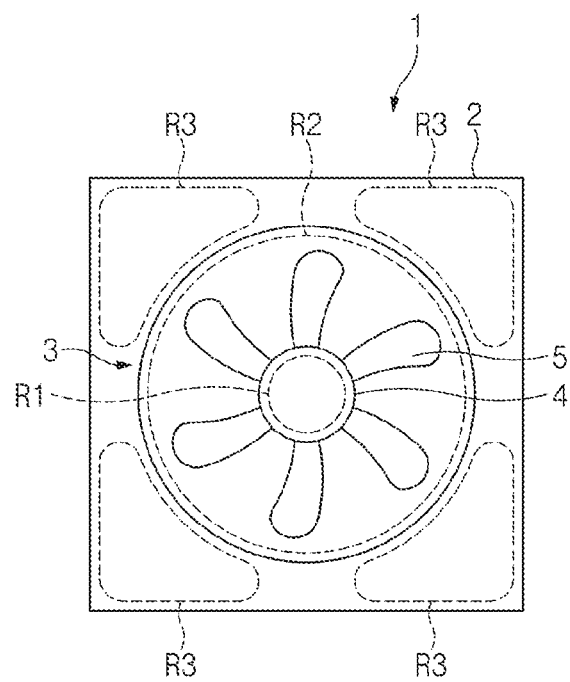
FIG. 1 illustrates a front view of a general cooling fan assembly for a vehicle.

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be ruled out in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 2:
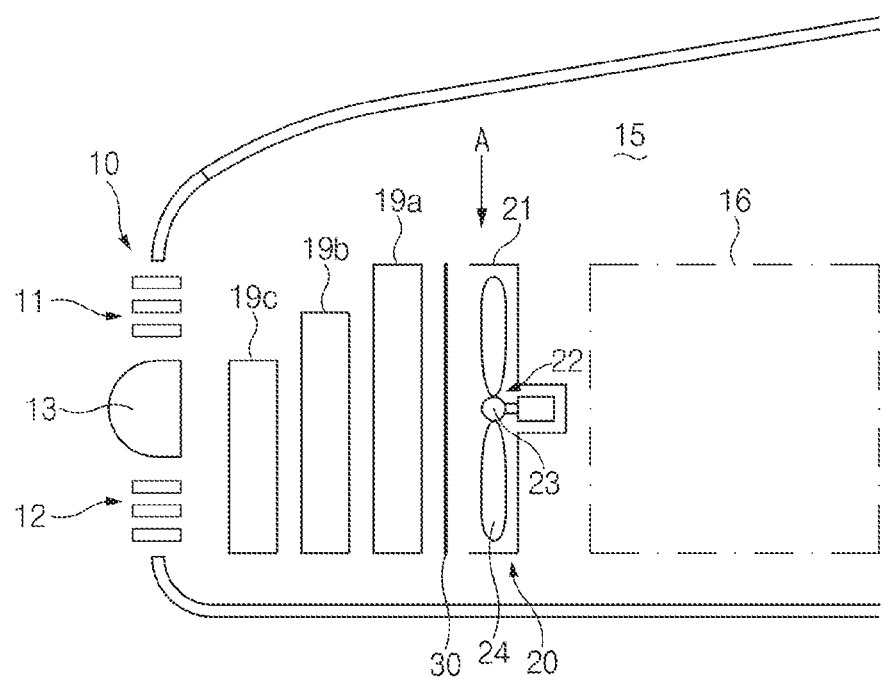
FIG. 2 illustrates a cross-sectional view of the front of a vehicle according to an exemplary embodiment of the present disclosure.
Figure 3:
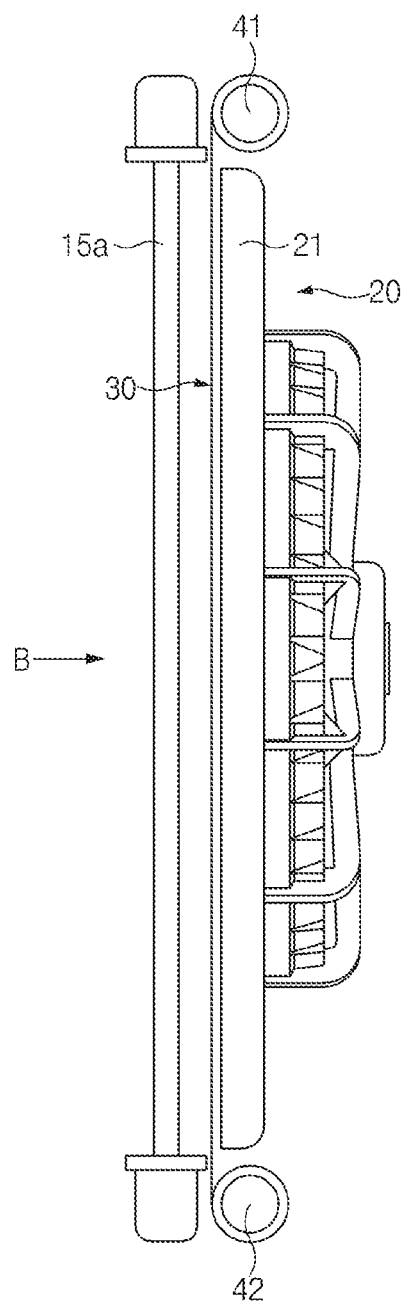
FIG. 3 illustrates a plan view which is viewed from a direction indicated by arrow A of FIG. 2.

Referring to FIG. 2, a vehicle may include a front end 10 of a vehicle body, grilles 11 and 12 mounted at the front end 10, and a front compartment 15 located behind the front end 10.

The front end 10 of the vehicle body may include a bumper 13, and a shock absorbing material, a bumper back beam, and the like may be connected to the bumper 13. The grilles 11 and 12 may be divided into an upper grille 11 and a lower grille 12 by the bumper 13. The upper grille 11 may be disposed above the bumper 13, and the lower grille 12 may be disposed below the bumper 13. Each of the upper grille 11 and the lower grille 12 may have openings through which ambient air passes.

The front compartment 15 may be located behind the front end 10, and the front compartment 15 may receive a prime mover such as an internal combustion engine or a power unit (e.g. an electric motor, a reduction gear). In the embodiment of FIG. 2, an internal combustion engine vehicle is illustrated, in which the front compartment 15 may receive an internal combustion engine 16 as the prime mover.

The front compartment 15 may receive a plurality of heat exchangers such as a radiator 19a, a condenser 19b, and an intercooler 19c. In the embodiment of FIG. 2, the condenser 19b and the intercooler 19c may be located in front of the radiator 19a. Alternatively, the arrangement of the radiator 19a, the condenser 19b, and the intercooler 19c may be varied depending on vehicle types.

A cooling fan assembly 20 may be located behind the heat exchangers 19a, 19b, and 19c. The cooling fan assembly 20 may include at least one cooling fan 22 located behind the heat exchangers 19a, 19b, and 19c. The cooling fan 22 may include a hub 23 and a plurality of blades 24 extending from the hub 23.

The cooling fan assembly 20 may include a fan shroud 21 surrounding the cooling fan 22, and a screen 30 movable transversely across the front of the fan shroud 21 and the front of the cooling fan 22.

Figure 4:
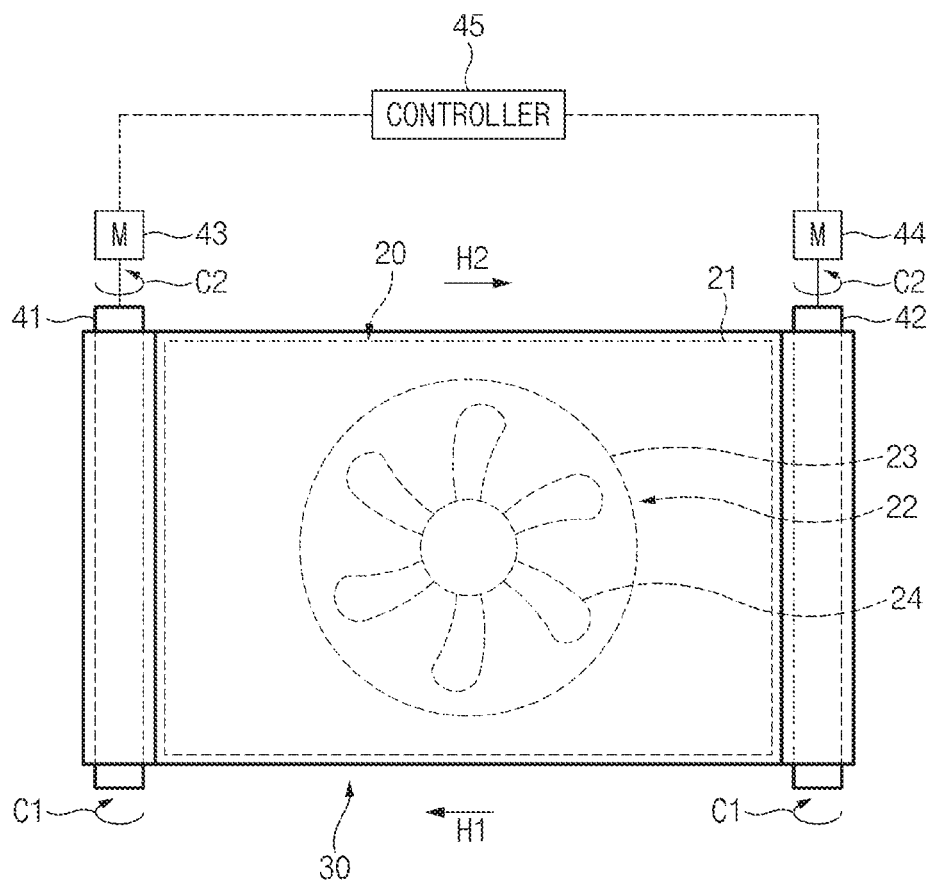
FIG. 4 illustrates a front view which is viewed from a direction indicated by arrow B of FIG. 3.

The fan shroud 21 may surround at least one cooling fan 22. For example, as illustrated in FIG. 4, the fan shroud 21 may surround one cooling fan 22. As another example, the fan shroud 21 may surround two or more cooling fans.

Figure 5:
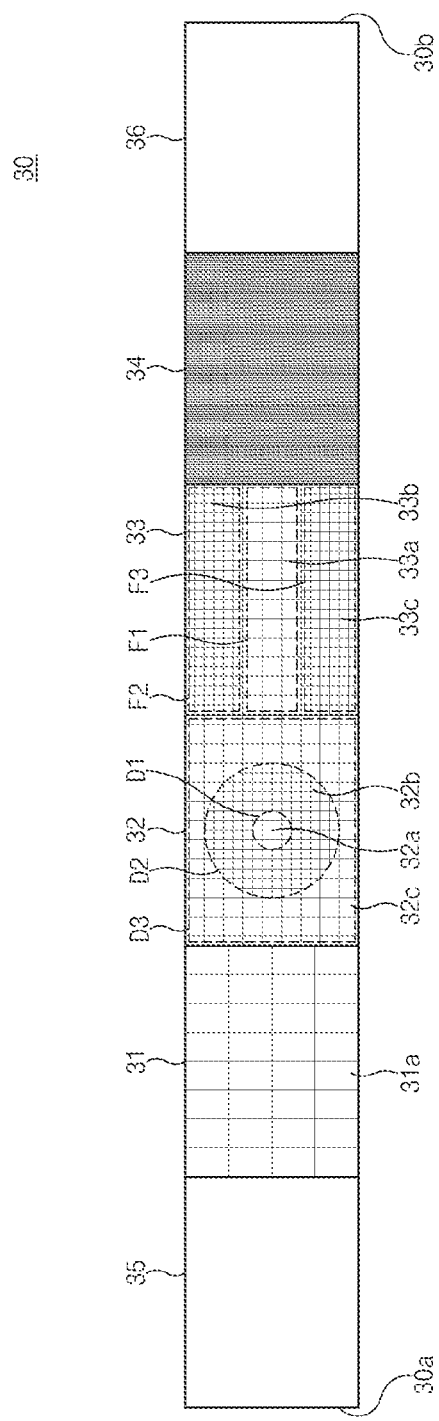
FIG. 5 illustrates a state of a screen which is fully laid flat in a cooling fan assembly for a vehicle according to an exemplary embodiment of the present disclosure.

The screen 30 may be wound on or unwound from a first roller 41 and a second roller 42 by the rotation of the first roller 41 and the rotation of the second roller 42 so that the screen 30 may move transversely across the front of the fan shroud 21 and the front of cooling fan 22. The first roller 41 and the second roller 42 may be rotatable on both sides of the fan shroud 21. Referring to FIG. 5, the screen 30 may have a first end 30a fixed to the first roller 41, and a second end 30b fixed to the second roller 42. As the first roller 41 rotates in a clockwise direction C1 or a counterclockwise direction C2, a portion of the screen 30 adjacent to the first end 30a may be wound on or unwound from the first roller 41. As the second roller 42 rotates in the counterclockwise direction C2 or the clockwise direction C1, a portion of the screen 30 adjacent to the second end 30b may be wound on or unwound from the second roller 42.

According to an exemplary embodiment, the screen 30 may move in a width direction of the fan shroud 21. The first roller 41 and the second roller 42 may be spaced apart from each other by a gap corresponding to a width of the fan shroud 21. An actuator may be connected to at least one of the first roller 41 and the second roller 42. As the first roller 41 and the second roller 42 are rotated by the actuator in the same direction, the screen 30 may move in the width direction of the fan shroud 21. Referring to FIG. 4, the first roller 41 and the second roller 42 may be individually rotatable on both left and right sides of the fan shroud 21. For example, the first roller 41 may be rotatable on the left of the fan shroud 21, and the second roller 42 may be rotatable on the right of the fan shroud 21. A first actuator 43 may be connected to the first roller 41, and the first actuator 43 may allow the first roller 41 to selectively rotate in the clockwise direction or the counterclockwise direction. A second actuator 44 may be connected to the second roller 42, and the second actuator 44 may allow the second roller 42 to selectively rotate in the clockwise direction or the counterclockwise direction. When the first roller 41 and the second roller 42 rotate in the clockwise direction C1, the screen 30 may move from left to right (H1 direction). When the first roller 41 and the second roller 42 rotate in the counterclockwise direction C2, the screen 30 may move from right to left (H2 direction).

According to another exemplary embodiment, the screen 30 may move in a height direction of the fan shroud 21. The first roller 41 and the second roller 42 may be spaced apart from each other by a gap corresponding to a height of the fan shroud 21. An actuator may be connected to at least one of the first roller 41 and the second roller 42. As the first roller 41 and the second roller 42 are rotated by the actuator in the same direction, the screen 30 may move in the height direction of the fan shroud 21.

FIG. 5 illustrates the screen 30 which is fully laid flat. Referring to FIG. 5, the screen 30 may include a plurality of mesh elements 31, 32, and 33, and a closure element 34. Each of the mesh elements 31, 32, and 33 may have a plurality of mesh openings allowing the air to flow into the fan shroud 21 and the cooling fan 22, and the closure element 34 may not have mesh openings so as to block the air from flowing into the fan shroud 21 and the cooling fan 22. The plurality of mesh elements 31, 32, and 33 may include a first mesh element 31, a second mesh element 32 connected to the first mesh element 31, and a third mesh element 33 connected to the second mesh element 32. Each of the plurality of mesh elements 31, 32, and 33 and the closure element 34 may have an area fully covering the front of the fan shroud 21 and the front of the cooling fan 22, and the plurality of mesh elements 31, 32, and 33 and the closure element 34 may have the same area as each other. In addition, the screen 30 may further include a first marginal element 35 connected to the first mesh element 31, and a second marginal element 36 connected to the closure element 34. The first end 30a of the screen 30 may be an end of the first marginal element 35, and the second end 30b of the screen 30 may be an end of the second marginal element 36. The screen 30 may be easily wound on or unwound from the first roller 41 and the second roller 42 by the first marginal element 35 and the second marginal element 36.

Figure 6:
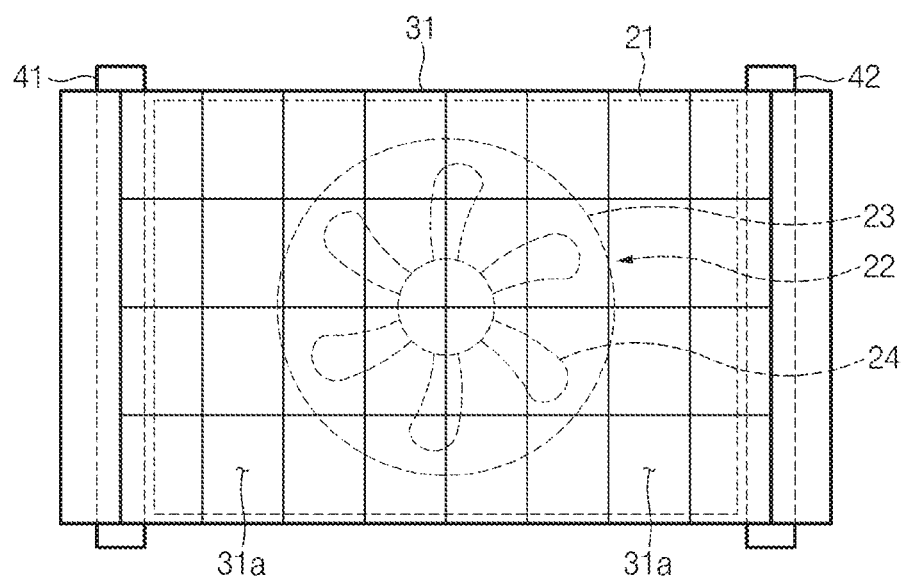
FIG. 6 illustrates a state of a cooling fan assembly for a vehicle according to an exemplary embodiment of the present disclosure, in which a first mesh element of a screen is shifted to a position where it covers the front of a fan shroud and the front of a cooling fan.
Figure 7:
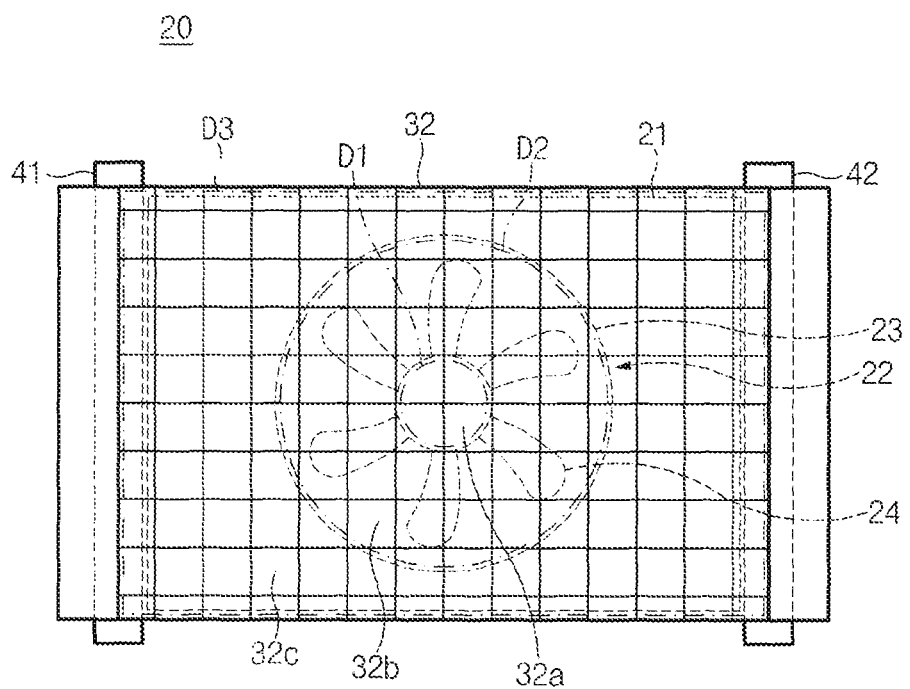
FIG. 7 illustrates a state of a cooling fan assembly for a vehicle according to an exemplary embodiment of the present disclosure, in which a second mesh element of a screen is shifted to a position where it covers the front of a fan shroud and the front of a cooling fan.
Figure 8:
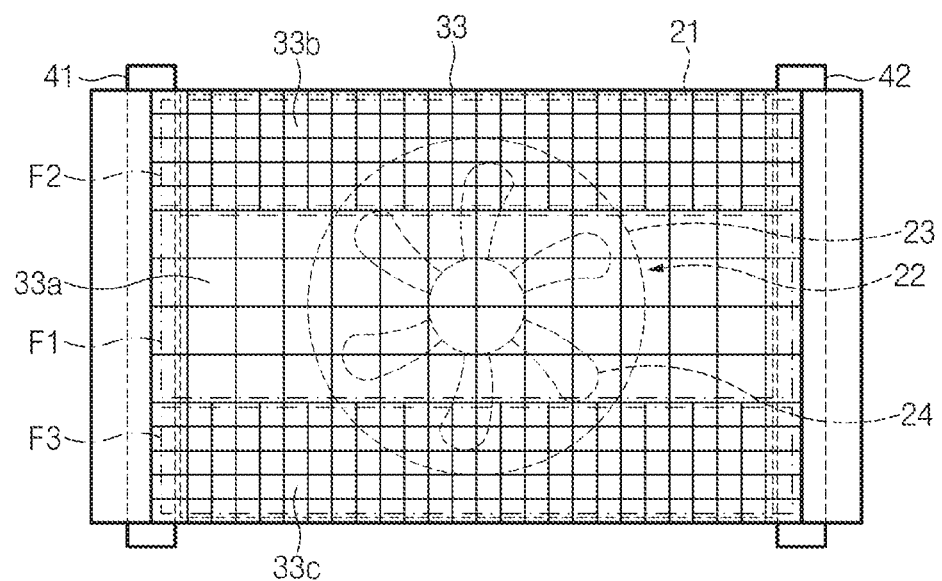
FIG. 8 illustrates a state of a cooling fan assembly for a vehicle according to an exemplary embodiment of the present disclosure, in which a third mesh element of a screen is shifted to a position where it covers the front of a fan shroud and the front of a cooling fan.
Figure 9:
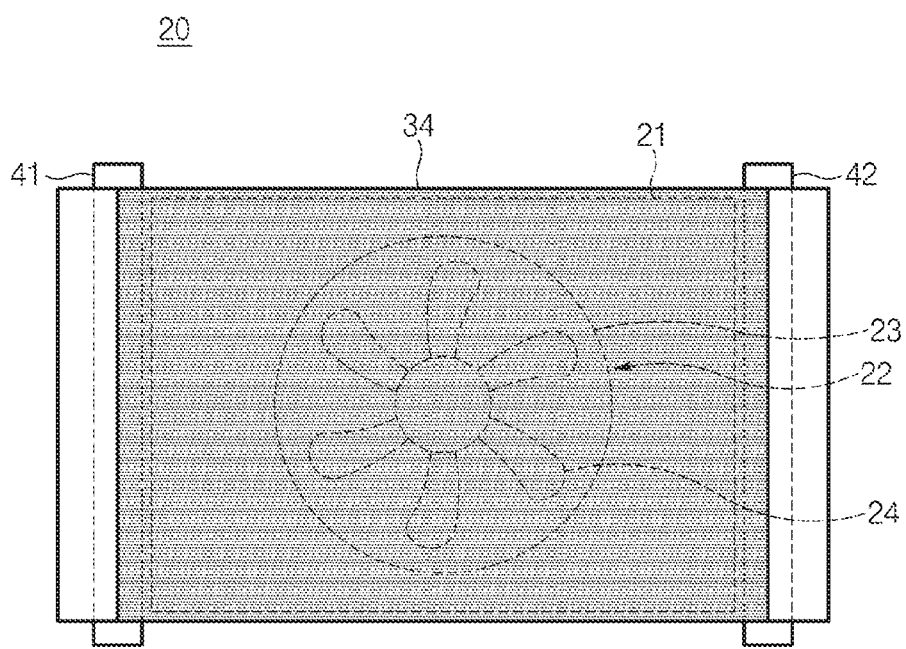
FIG. 9 illustrates a state of a cooling fan assembly for a vehicle according to an exemplary embodiment of the present disclosure, in which a closure element of a screen is shifted to a position where it covers the front of a fan shroud and the front of a cooling fan.

When the screen 30 moves by the rotation of the first roller 41 and the second roller 42, the rotation position of the actuators 43 and 44 may be controlled by a controller 45, and any one of the plurality of mesh elements 31, 32, and 33 and the closure element 34 may be shifted to a position in which it fully covers the front of the fan shroud 21 and the front of the cooling fan 22. For example, when the rotation position of the actuators 43 and 44 is 0°, the first mesh element 31 may be shifted to a position in which it fully covers the front of the fan shroud 21 and the front of the cooling fan 22 as illustrated in FIG. 6. When the rotation position of the actuators 43 and 44 is 100°, the second mesh element 32 may be shifted to a position in which it fully covers the front of the fan shroud 21 and the front of the cooling fan 22 as illustrated in FIG. 7. When the rotation position of the actuators 43 and 44 is 200°, the third mesh element 33 may be shifted to a position in which it fully covers the front of the fan shroud 21 and the front of the cooling fan 22 as illustrated in FIG. 8. When the rotation position of the actuators 43 and 44 is 300°, the closure element 34 may be shifted to a position in which it fully covers the front of the fan shroud 21 and the front of the cooling fan 22 as illustrated in FIG. 9.

In particular, any one of the plurality of mesh elements 31, 32, and 33 and the closure element 34 may be shifted to a position in which it fully covers the front of the fan shroud 21 and the front of the cooling fan 22 depending on vehicle speed (or velocity) conditions.

The first mesh element 31 may have a plurality of mesh openings 31a, and the plurality of mesh openings 31a may have the same size. Referring to FIG. 6, when the first mesh element 31 covers the front of the fan shroud 21 and the front of the cooling fan 22, the first mesh element 31 may have the mesh openings 31a of the same size so that the air flow may not be uniformly distributed. When there is no need to uniformly distribute the air flow into the front compartment 15, such as when the engine of the vehicle is in an idle condition (that is, when the speed of the vehicle is 0 kph (kilometer per hour)), the first mesh element 31 may be aligned to cover the front of the fan shroud 21 and the front of the cooling fan 22 as illustrated in FIG. 6.

Referring to FIG. 7, the second mesh element 32 may be divided into a center area D1, an annular area D2 surrounding the center area D1, and an outermost area D3 surrounding the annular area D2. The center area D1 may correspond to the hub 23 of the cooling fan 22, the annular area D2 may correspond to an area in which the blades 24 of the cooling fan 22 rotate, and the outermost area D3 may correspond to the front of the fan shroud 21 surrounding the blades 24. The second mesh element 32 may have a plurality of mesh openings 32a, 32b, and 32c, and the mesh openings 32a, 32b, and 32c of the second mesh element 32 may have different sizes in the areas D1, D2, and D3 of the second mesh element 32. The mesh openings 32b in the annular area D2 may be smaller than the mesh openings 32a in the center area D1 and the mesh openings 32c in the outermost area D3. The mesh openings 32a in the center area D1 and the mesh openings 32c in the outermost area D3 may have the same or similar size. During the operation of the cooling fan 22, when the blades 24 rotate, flow resistance in the annular area D2 may be greater than flow resistance in the center area D1 and flow resistance in the outermost area D3 since the mesh openings 32b in the annular area D2 are relatively small. Thus, the air flow may not concentrate on the annular area D2, and may be uniformly distributed throughout the center area D1, the annular area D2, and the outermost area D3. As a result, the cooling performance of the heat exchangers 19a, 19b, and 19c may be improved.

When the driving condition of the vehicle is a low speed driving condition (for example, a condition in which the speed of the vehicle is 50 kph or less), it may be necessary to cool the heat exchangers 19a, 19b, and 19c. Since the air velocity is relatively low in the low speed driving condition, flow resistance by the bumper 13 and the grilles 11 and 12 may be relatively reduced, while flow resistance by the cooling fan 22 may be relatively increased. In the low speed driving condition of the vehicle, the second mesh element 32 may be aligned to cover the front of the fan shroud 21 and the front of the cooling fan 22 as illustrated in FIG. 7, so that the air flow into the front compartment 15 may be uniformly distributed.

The third mesh element 33 may be divided into a middle area F1, an upper area F2 located above the middle area F1, and a lower area F3 located below the middle area F1. Each of the middle area F1, the upper area F2, and the lower area F3 may have a band shape extending along the width direction of the fan shroud 21. The middle area F1 may correspond to the bumper 13 disposed at the front end of the vehicle, the upper area F2 may correspond to the upper grille 11, and the lower area F3 may correspond to the lower grille 12. The third mesh element 33 may have a plurality of mesh openings 33a, 33b, and 33c, and the mesh openings 33a, 33b, and 33c may have different sizes in the areas F1, F2, and F3 of the third mesh element 33. The mesh openings 33a in the middle area F1 may be larger than the mesh openings 33b in the upper area F2 and the mesh openings 33c in the lower area F3. The mesh openings 33b in the upper area F2 and the mesh openings 33c in the lower area F3 may have the same or similar size. During the operation of the cooling fan 22, flow resistance in the middle area F1 may be less than flow resistance in the upper area F2 and flow resistance in the lower area F3. Thus, the air flow may not concentrate on the upper area F2 and the lower area F3, and may be uniformly distributed throughout the middle area F1, the upper area F2, and the lower area F3.

When the driving condition of the vehicle is a medium speed driving condition (for example, a condition in which the speed of the vehicle exceeds 50 kph and is 100 kph or less), it may be necessary to cool the heat exchangers 19a, 19b, and 19c. Since the air velocity in the medium speed driving condition is higher than that in the low speed driving condition, flow resistance by the bumper 13 and the grilles 11 and 12 may be relatively increased, while flow resistance by the cooling fan 22 may be relatively reduced. In the medium speed driving condition of the vehicle, the third mesh element 33 may be aligned to cover the front of the fan shroud 21 and the front of the cooling fan 22 as illustrated in FIG. 8, so that the air flow into the front compartment 15 may be uniformly distributed.

Referring to FIG. 9, the closure element 34 may be made of a material that is able to block the flow of air into the fan shroud 21 and the cooling fan 22. In particular, the closure element 34 may not have openings.

When the driving condition of the vehicle is a high speed driving condition (for example, a condition in which the speed of the vehicle exceeds 100 kph or 62 mph), it may be unnecessary to cool the heat exchangers 19a, 19b, and 19c. As illustrated in FIG. 9, the closure element 34 may be aligned to cover the front of the fan shroud 21 and the front of the cooling fan 22 so that the air flow into the fan shroud 21 and the cooling fan 22 may be entirely blocked. As the air is stagnant between the closure element 34 and the grilles 11 and 12, a high pressure may be formed. Since the air flow into the front compartment 15 is completely blocked, a drag coefficient may be reduced so that aerodynamic performance may be improved, and fuel efficiency may be improved.

FIGS. 10 to 13 illustrate a cooling fan assembly for a vehicle according to another exemplary embodiment of the present disclosure.

Figure 10:
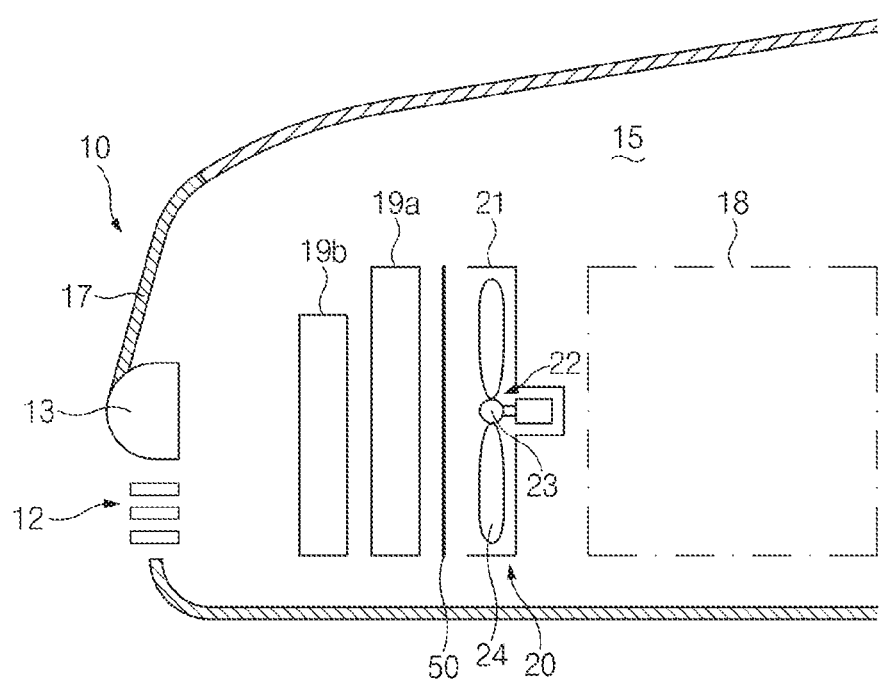
FIG. 10 illustrates a cross-sectional view of the front of a vehicle according to another exemplary embodiment of the present disclosure.

FIG. 10 illustrates a side cross-sectional view of the front of an electric vehicle. As illustrated in FIG. 10, a front end of the electric vehicle may be an upper closed structure in which an upper grille is removed to reduce a front opening. Referring to FIG. 10, the electric vehicle may include a closure wall 17 provided on an upper portion of the front end 10, the bumper 13 disposed below the closure wall 17, the lower grille 12 disposed below the bumper 13, and the front compartment 15 located behind the front end 10.

The front compartment 15 may be located behind the front end 10, and the front compartment 15 may receive an electric motor 18 as a prime mover. An electric charging port may be placed on the closure wall 17.

The front compartment 15 may receive a plurality of heat exchangers such as the radiator 19a and the condenser 19b. According to the embodiment of FIG. 10, the condenser 19b may be located in front of the radiator 19a. Alternatively, the arrangement of the radiator 19a and the condenser 19b may be varied depending on vehicle types.

The cooling fan assembly 20 may be located behind the plurality of heat exchangers 19a and 19b. The cooling fan assembly 20 may include the fan shroud 21 and at least one cooling fan 22. The fan shroud 21 may surround at least one cooling fan 22, and the cooling fan 22 may include the hub 23 and the plurality of blades 24 extending from the hub 23.

Referring to FIG. 10, the cooling fan assembly 20 according to this exemplary embodiment of the present disclosure may include a screen 50 movable transversely across the front of the fan shroud 21 and the front of the cooling fan 22.

Figure 11:
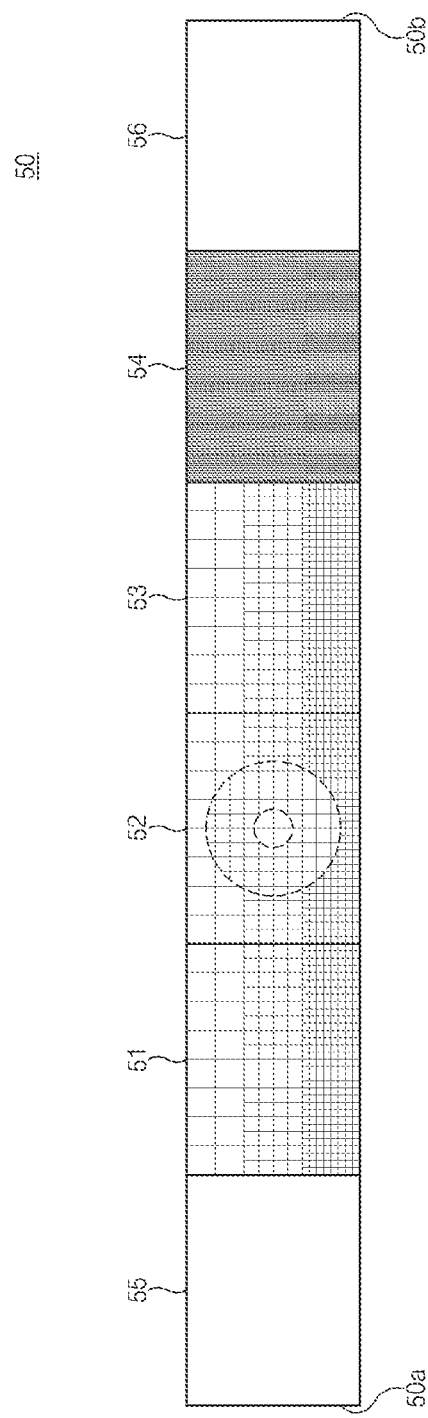
FIG. 11 illustrates a state of a screen which is fully laid flat in a cooling fan assembly for a vehicle according to another exemplary embodiment of the present disclosure.

FIG. 11 illustrates the screen 50 which is fully laid flat. Referring to FIG. 11, the screen 50 may have a first end 50a fixed to the first roller 41 (see FIG. 4), and a second end 50b fixed to the second roller 42 (see FIG. 4). The screen 50 may be wound on or unwound from the first roller 41 with respect to the first end 50a, and the screen 50 may be wound on or unwound from the second roller 42 with respect to the second end 50b.

Referring to FIG. 11, the screen 50 may include a plurality of mesh elements 51, 52, and 53, and a closure element 54. Each of the mesh elements 51, 52, and 53 may have a plurality of mesh openings, and the closure element 54 may not have mesh openings. The plurality of mesh elements 51, 52, and 53 may include a first mesh element 51, a second mesh element 52 connected to the first mesh element 51, and a third mesh element 53 connected to the second mesh element 52. Each of the plurality of mesh elements 51, 52, and 53 and the closure element 54 may have an area fully covering the front of the fan shroud 21 and the front of the cooling fan 22, and each of the plurality of mesh elements 51, 52, and 53 and the closure element 54 may have the same area as each other. In addition, the screen 50 may further include a first marginal element 55 connected to the first mesh element 51, and a second marginal element 56 connected to the closure element 54. The first end 50a of the screen 50 may be an end of the first marginal element 55, and the second end 50b of the screen 50 may be an end of the second marginal element 56.

Figure 12:
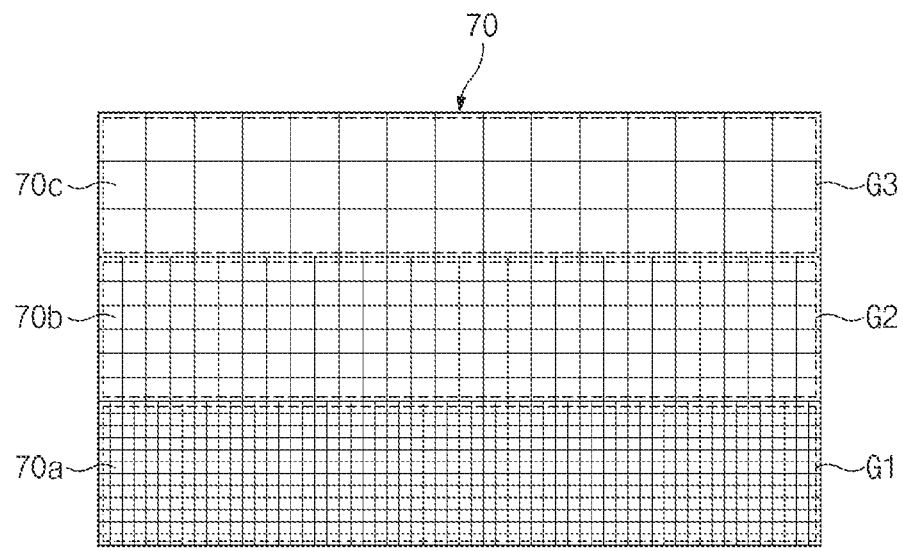
FIG. 12 illustrates an auxiliary mesh element of a cooling fan assembly for a vehicle according to another exemplary embodiment of the present disclosure.

The upper portion of the front end 10 of the electric vehicle may be closed by the closure wall 17, and a lower portion thereof may be opened by the lower grille 12. As illustrated in FIG. 12, the screen 50 may further include an auxiliary mesh element 70 for uniformly distributing the air flow when the air flows into the front compartment 15.

The auxiliary mesh element 70 may be divided into a lower area G1, a middle area G2 located above the lower area G1, and an upper area G3 located above the middle area G2. Each of the lower area G1, the middle area G2, and the upper area G3 may have a band shape extending along the width direction of the fan shroud 21. The lower area G1 may correspond to the lower grille 12, the middle area G2 may correspond to the bumper 13 disposed at the front end of the vehicle, and the upper area G3 may correspond to the closure wall 17. The auxiliary mesh element 70 may have a plurality of mesh openings 70a, 70b, and 70c, and the mesh openings 70a, 70b, and 70c may have different sizes in the areas G1, G2, and G3 of the auxiliary mesh element 70. The mesh openings 70b in the middle area G2 may be larger than the mesh openings 70a in the lower area G1, and the mesh openings 70c in the upper area G3 may be larger than the mesh openings 70b in the middle area G2. During the operation of the cooling fan 22, flow resistance in the middle area G2 may be less than flow resistance in the lower area G1 and flow resistance in the upper area G3 may be less than flow resistance in the middle area G2. Thus, the air flow may not concentrate on the lower area G1, but may be uniformly distributed throughout the lower area G1, the middle area G2, and the upper area G3.

Figure 13:
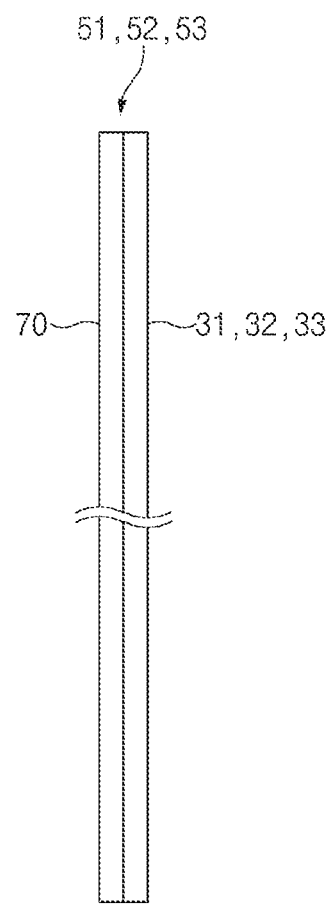
FIG. 13 illustrates a side view of a screen in a cooling fan assembly for a vehicle according to another exemplary embodiment of the present disclosure.

Referring to FIG. 13, the auxiliary mesh element 70 may overlap the first mesh element 31 of FIG. 5 to create the first mesh element 51 as illustrated in FIG. 11. The auxiliary mesh element 70 may overlap the second mesh element 32 of FIG. 5 to create the second mesh element 52 as illustrated in FIG. 11. The auxiliary mesh element 70 may overlap the third mesh element 33 of FIG. 5 to create the third mesh element 53 as illustrated in FIG. 11. Thus, the air flow distribution with respect to the front end 10 of the electric vehicle may be efficiently performed by the auxiliary mesh element 70.

Since the other elements and operations in this exemplary embodiment are similar to or the same as those in the exemplary embodiment of FIGS. 2 to 9, a detailed description thereof will be omitted.

Figure 14:
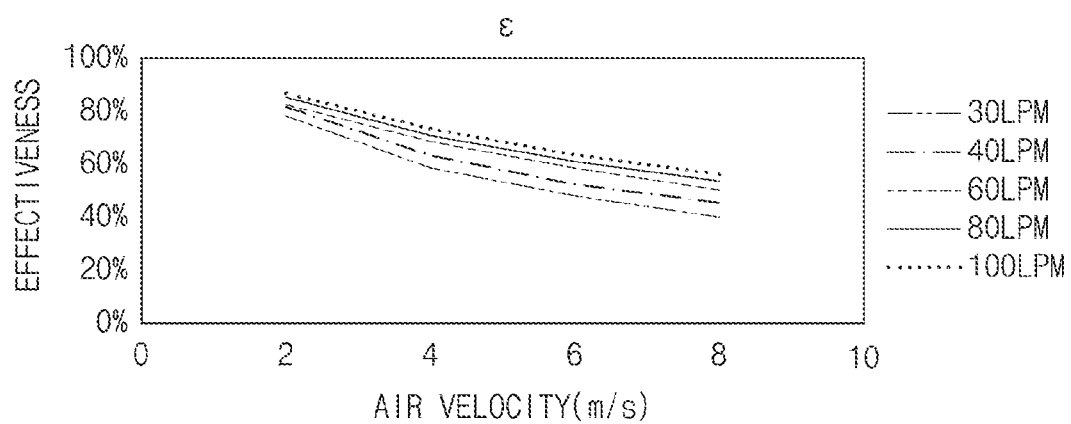
FIG. 14 illustrates a graph of a relationship between effectiveness and velocity of air coming into contact with a front compartment.

As the vehicle speed increases, the velocity of air flowing into the front compartment 15 may gradually increase. Referring to FIG. 14, as the air velocity increases, effectiveness of each of the heat exchangers 19a, 19b, and 19c may relatively decrease. The effectiveness of the heat exchanger may be calculated according to an effectiveness-NTU method. As the air velocity increases, a contact time between the air and the heat exchanger becomes relatively short, and thus the effectiveness of the heat exchanger may be reduced.

According to exemplary embodiments of the present disclosure, the screen 30 or 50 may be movable across the front of the fan shroud 21 and the front of the cooling fan 22, thereby uniformly distributing the air flow depending on vehicle speeds. In particular, in the low and medium speed conditions of the vehicle, the flow resistance may be formed by the second mesh element 32 or 52 and the third mesh element 33 or 53 of the screen 30 or 50, and thus the amount of air flowing into the front compartment 15 may be relatively reduced (approximately 5% or less). However, as the air flow is uniformly distributed by the second mesh element 32 or 52 and the third mesh element 33 or 53 of the screen 30 or 50, the contact time of the air and the heat exchangers 19a, 19b, and 19c may be relatively increased, and thus a heat removal rate of the heat exchangers 19a, 19b, and 19c may be significantly increased (approximately 20% or more). That is, the flow resistance by the screen 30 or 50 may be negligible compared to the improved cooling performance of the heat exchangers 19a, 19b, and 19c, and thus the efficiency of the heat exchangers may be entirely improved.

Figure 15:
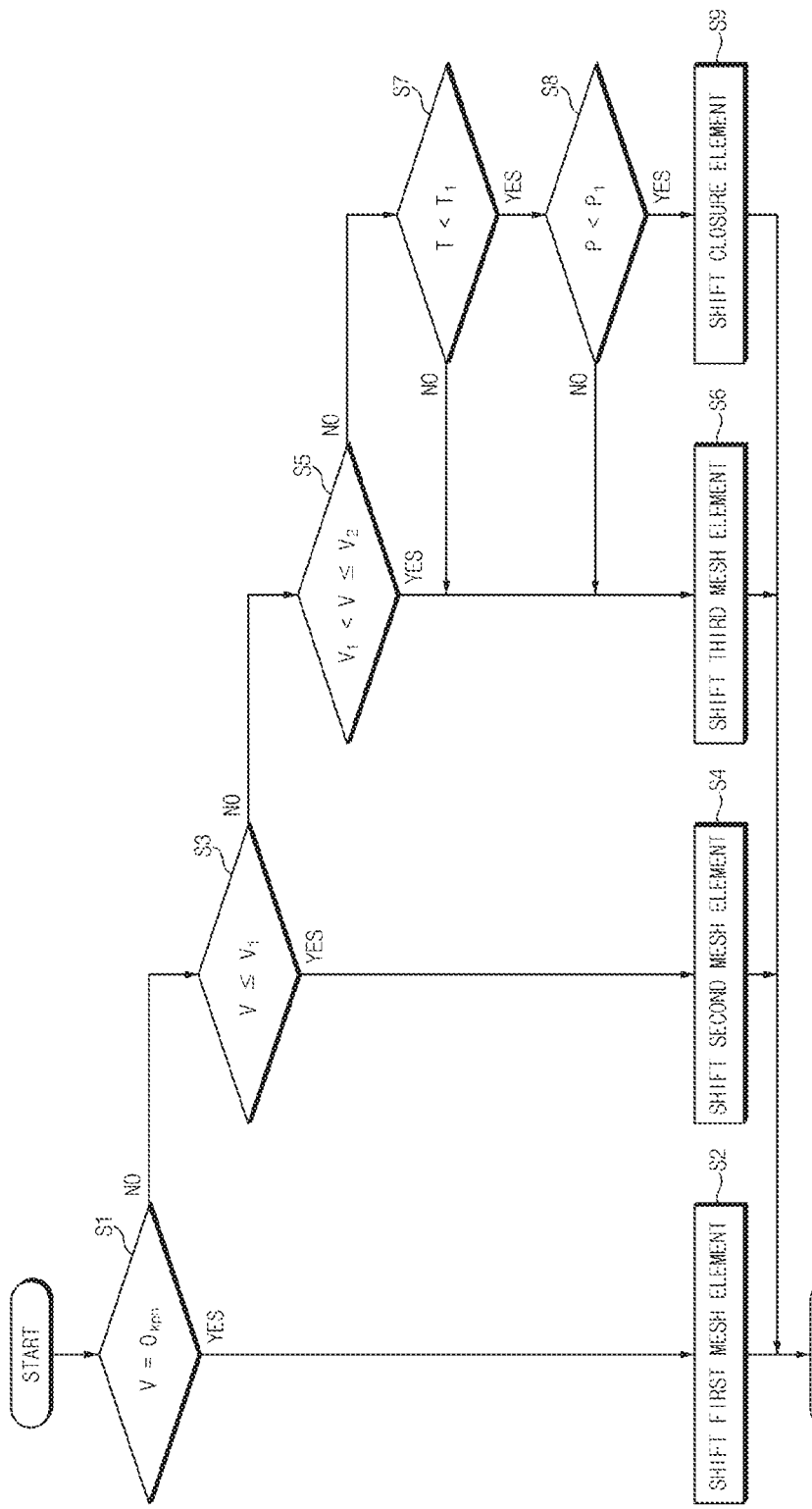
FIG. 15 illustrates a flowchart of a method for controlling a cooling fan assembly for a vehicle according to an exemplary embodiment of the present disclosure.

FIG. 15 illustrates a method for controlling a cooling fan assembly for a vehicle according to an exemplary embodiment of the present disclosure.

It may be determined whether or not a speed V of a vehicle is 0 kph (S1). When it is determined that the speed V of the vehicle is 0 kph, the first roller 41 and the second roller 42 may be rotated to shift the first mesh element 31 or 51 to a position in which the first mesh element 31 or 51 covers the front of the fan shroud 21 and the front of the cooling fan 22 (S2). In a condition in which the speed V of the vehicle is 0 kph, it may not be necessary to uniformly distribute the air flow into the front compartment 15, and thus the first mesh element 31 or 51 may be aligned to cover the front of the fan shroud 21 and the front of the cooling fan 22.

It may be determined whether or not the speed V of the vehicle is lower than or equal to a first predetermined speed V1 (S3). The first predetermined speed V1 may be a reference speed for determining whether the speed of the vehicle is in a low speed condition. For example, the first predetermined speed V1 may be approximately 50 kph.

When it is determined that the speed V of the vehicle is lower than or equal to the first predetermined speed V1, the first roller 41 and the second roller 42 may be rotated to shift the second mesh element 32 or 52 to a position in which the second mesh element 32 or 52 covers the front of the fan shroud 21 and the front of the cooling fan 22 (S4). When the speed V of the vehicle is lower than or equal to the first predetermined speed V1, which means that the vehicle is in the low speed driving condition, it may be necessary to cool the heat exchangers 19a, 19b, and 19c. Since the air velocity is relatively low in the low speed driving condition of the vehicle, flow resistance by the bumper 13 and the grilles 11 and 12 may be relatively reduced, while flow resistance by the cooling fan 22 may be relatively increased. In the low speed driving condition of the vehicle, the second mesh element 32 or 52 may be aligned to cover the front of the fan shroud 21 and the front of the cooling fan 22 so that the air flow into the front compartment 15 may be uniformly distributed. Thus, the cooling performance of the heat exchangers 19a, 19b, and 19c may be improved.

It may be determined whether or not the speed V of the vehicle exceeds the first predetermined speed V1 and is lower than or equal to a second predetermined speed V2 (S5). The second predetermined speed V2 may be a reference speed for determining whether the speed of the vehicle is in a high speed condition. For example, the second predetermined speed V2 may be approximately 100 kph.

When it is determined that the speed V of the vehicle exceeds the first predetermined speed V1 and is lower than or equal to the second predetermined speed V2, the first roller 41 and the second roller 42 may be rotated to shift the third mesh element 33 or 53 to a position in which the third mesh element 33 or 53 covers the front of the fan shroud 21 and the front of the cooling fan 22 (S6). When the speed V of the vehicle exceeds the first predetermined speed V1 and is lower than or equal to the second predetermined speed V2, which means that the vehicle is in the medium speed driving condition, it may be necessary to cool the heat exchangers 19a, 19b, and 19c. Since the air velocity in the medium speed driving condition is higher than that in the low speed driving condition, flow resistance by the bumper 13 and the grilles 11 and 12 may be relatively increased, while flow resistance by the cooling fan 22 may be relatively reduced. In the medium speed driving condition of the vehicle, the third mesh element 33 or 53 may be aligned to cover the front of the fan shroud 21 and the front of the cooling fan 22 so that the air flow into the front compartment 15 may be uniformly distributed. Thus, the cooling performance of the heat exchangers 19a, 19b, and 19c may be improved.

When it is determined that the speed V of the vehicle exceeds the second predetermined speed V2, it may be determined whether or not a temperature T of a coolant passing through the radiator 19a is lower than a predetermined temperature T1 (S7). The predetermined temperature T1 may be a reference temperature for determining whether or not it is necessary to cool the radiator 19a. For example, the predetermined temperature T1 may be 100° C. That is, when the temperature T of the coolant is lower than the predetermined temperature T1, this means that there is no cooling load, and when the temperature T of the coolant is higher than or equal to the predetermined temperature T1, this means that there is a cooling load.

Thereafter, when it is determined that the temperature T of the coolant passing through the radiator 19a is lower than the predetermined temperature T1, it may be determined whether or not a pressure P of a refrigerant passing through the condenser 19b is lower than a predetermined pressure P1 (S8). The predetermined pressure P1 may be a reference pressure for determining whether or not it is necessary to cool the condenser 19b. For example, the predetermined pressure P1 may be 1000 kPa. That is, when the pressure P of the refrigerant is lower than the predetermined pressure P1, this means that there is no cooling load, and when the pressure P of the refrigerant is higher than or equal to the predetermined pressure P1, this means that there is a cooling load.

When it is determined that the speed V of the vehicle exceeds the second predetermined speed V2, the temperature T of the coolant is lower than the predetermined temperature T1, and the pressure P of the refrigerant is lower than the predetermined pressure P1, the first roller 41 and the second roller 42 may be rotated to shift the closure element 34 or 54 to a position in which the closure element 34 or 54 covers the front of the fan shroud 21 and the front of the cooling fan 22 (S9). When the speed V of the vehicle exceeds the second predetermined speed V2, the temperature T of the coolant is lower than the predetermined temperature T1, and the pressure P of the refrigerant is lower than the predetermined pressure P1, which means that the vehicle is in the high speed driving condition, it may be unnecessary to cool the heat exchangers 19a, 19b, and 19c. In the high speed driving condition of the vehicle, the closure element 34 or 54 may be aligned to cover the front of the fan shroud 21 and the front of the cooling fan 22 so that the air flow into the fan shroud 21 and the cooling fan 22 may be entirely blocked. As the air is stagnant between the closure element 34 and the grilles 11 and 12, a high pressure may be formed. Since the air flow into the front compartment 15 is blocked, a drag coefficient may be reduced to thereby improve aerodynamic performance, improve fuel efficiency, and reduce power consumption.

As set forth above, according to exemplary embodiments of the present disclosure, the screen may be movable transversely across the front of the fan shroud and the front of the cooling fan, thereby uniformly distributing the air flow depending on vehicle speeds. In particular, in the low and medium speed conditions of the vehicle, the air flow may be uniformly distributed by the second mesh element and the third mesh element of the screen so that the contact time of the air and the heat exchangers may be relatively increased, and thus the cooling performance of the heat exchangers may be improved.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A cooling fan assembly for a vehicle, the cooling fan assembly comprising:
   a cooling fan having a hub and a plurality of blades extending from the hub;
   a fan shroud surrounding the cooling fan; and
   a screen movable transversely across a front of the cooling fan and a front of the fan shroud;
   wherein the screen includes a plurality of mesh elements including a first mesh element, a second mesh element connected to the first mesh element, and a third mesh element connected to the second mesh element;
   wherein the second mesh element is divided into a center area corresponding to the hub of the cooling fan, an annular area corresponding to an area in which the blades of the cooling fan rotate, and an outermost area corresponding to the front of the fan shroud surrounding the blades; and
   wherein mesh openings in the annular area are smaller than mesh openings in the center area and mesh openings in the outermost area.

2. The cooling fan assembly according to claim 1, further comprising a first roller and a second roller rotatably mounted on both sides of the fan shroud, wherein the screen is configured to be wound on or unwound from the first roller and the second roller by a rotation of the first roller and a rotation of the second roller so that the screen moves transversely across the front of the fan shroud and the front of the cooling fan.

3. The cooling fan assembly according to claim 2, wherein:
   the screen further includes a closure element; and
   the closure element is made of a material that is able to block the air from flowing into the fan shroud and the cooling fan.

4. The cooling fan assembly according to claim 3, wherein one of the plurality of mesh elements or the closure element is positioned to cover the front of the fan shroud and the front of the cooling fan depending on vehicle speed conditions.

5. The cooling fan assembly according to claim 1, wherein the first mesh element has a plurality of mesh openings having the same size.

6. The cooling fan assembly according to claim 1, wherein the third mesh element is divided into a middle area corresponding to a bumper disposed at a front end of the vehicle, an upper area corresponding to an upper grille disposed at the front end of the vehicle, and a lower area corresponding to a lower grille disposed at the front end of the vehicle.

7. The cooling fan assembly according to claim 1, wherein the screen further includes a closure element that is connected to the third mesh element.

8. The cooling fan assembly according to claim 1, wherein the screen further includes an auxiliary mesh element individually overlapping the first mesh element, the second mesh element, and the third mesh element.

9. A cooling fan assembly for a vehicle, the cooling fan assembly comprising:
a cooling fan having a hub and a plurality of blades extending from the hub;
a fan shroud surrounding the cooling fan;
a screen positioned across an air flow path extending from a front of the vehicle to the cooling fan, the screen including a plurality of mesh elements and a closure element, the plurality of mesh elements having a plurality of mesh openings; and
at least one roller rotatably mounted on the fan shroud, wherein the screen is configured to be wound on or unwound from the at least one roller by a rotation of the at least one roller to adjust which one of the plurality of mesh elements and the closure element of the screen is positioned in the air flow path;
wherein the plurality of mesh elements includes a first mesh element, a second mesh element connected to the first mesh element, and a third mesh element connected to the second mesh element;
wherein the second mesh element is divided into a center area corresponding to the hub of the cooling fan, an annular area corresponding to an area in which the blades of the cooling fan rotate, and an outermost area corresponding to the front of the fan shroud surrounding the blades; and
wherein mesh openings in the annular area are smaller than mesh openings in the center area and mesh openings in the outermost area.

10. The cooling fan assembly according to claim 9, wherein the first mesh element has a plurality of mesh openings having a same size.

11. The cooling fan assembly according to claim 10, wherein:
the screen further includes an auxiliary mesh element individually overlapping the first mesh element, the second mesh element, and the third mesh element;
the auxiliary mesh element is divided into a lower area, a middle area located above the lower area, and an upper area located above the middle area;
mesh openings in the middle area of the auxiliary mesh element are larger than mesh openings in the lower area of the auxiliary mesh element; and
mesh openings in the upper area of the auxiliary mesh element are larger than mesh openings in the middle area of the auxiliary mesh element.

12. A method for controlling a cooling fan assembly for a vehicle, the method comprising:
determining a speed of the vehicle; and
shifting a screen of the cooling fan assembly according to the determined speed, the screen comprising a plurality of mesh elements and a closure element;
wherein when the determined speed is 0 kph, shifting the screen of the cooling fan assembly comprises rotating a first roller and a second roller to shift a first mesh element of the screen to a position in front of a fan shroud and a cooling fan, the first mesh element having first mesh openings of a first size; and
wherein when the determined speed is greater than 0 kph but less than or equal to a predetermined first speed, shifting the screen of the cooling fan assembly further comprises rotating the first roller and the second roller to shift a second mesh element of the screen to the position in front of the fan shroud and the cooling fan, the second mesh element comprising a center area having second mesh openings, an annular area surrounding the center area, the annular area having third mesh openings, and an outermost area surrounding the annular area, the outermost area having fourth mesh openings.

13. The method of claim 12, wherein:
the third mesh openings in the annular area are smaller than the second mesh openings in the center area and smaller than the fourth mesh openings in the outermost area; and
the second mesh openings in the center area and the fourth mesh openings in the outermost area have a same or similar size.

14. The method of claim 12, wherein when the determined speed is greater than the predetermined first speed but less than or equal to a predetermined second speed, shifting the screen of the cooling fan assembly comprises:
rotating the first roller and the second roller to shift a third mesh element of the screen to the position in front of the fan shroud and the cooling fan, the third mesh element comprising a middle area having fifth mesh openings, an upper area above the middle area, the upper area having sixth mesh openings, and a lower area below the middle area, the lower area having seventh mesh openings.

15. The method of claim 14, wherein:
the fifth mesh openings of the middle area are larger than the sixth mesh openings of the upper area and smaller than the seventh mesh openings of the lower area; and
the sixth mesh openings of the upper area and the seventh mesh openings of the lower area have a same or similar size.

16. The method of claim 14, wherein when the determined speed is greater than the predetermined second speed, shifting the screen of the cooling fan assembly comprises:
rotating the first roller and the second roller to shift the closure element of the screen to the position in front of the fan shroud and the cooling fan; and
blocking a flow of air into the fan shroud and the cooling fan using the closure element.

17. The cooling fan assembly according to claim 6, wherein mesh openings in the middle area are larger than mesh openings in the upper area and mesh openings in the lower area.

18. The cooling fan assembly according to claim 8, wherein the auxiliary mesh element is divided into a lower area, a middle area located above the lower area, and an upper area located above the middle area, mesh openings in the middle area being larger than mesh openings in the lower area.

19. The cooling fan assembly according to claim 8, wherein the auxiliary mesh element is divided into a lower area, a middle area located above the lower area, and an upper area located above the middle area, mesh openings in the upper area being larger than mesh openings in the middle area.

20. The cooling fan assembly according to claim 10, wherein:
- the third mesh element is divided into a middle area, an upper area, and a lower area;
- mesh openings in the middle area are larger than mesh openings in the upper area and mesh openings in the lower area; and
- the closure element is connected to the third mesh element.

\* \* \* \* \*